(12) United States Patent
Stolt et al.

(10) Patent No.: US 8,399,762 B2
(45) Date of Patent: Mar. 19, 2013

(54) ELECTRICAL FEED-THROUGH

(75) Inventors: Lars Stolt, Uppsala (SE); Olle Lundberg, Uppsala (SE)

(73) Assignee: Solibro Research AB, Uppsala (SE)

(*) Notice: Subject to any disclaimer, the term of this patent is extended or adjusted under 35 U.S.C. 154(b) by 638 days.

(21) Appl. No.: 12/663,900

(22) PCT Filed: Jun. 5, 2008

(86) PCT No.: PCT/SE2008/050674
§ 371 (c)(1),
(2), (4) Date: Dec. 10, 2009

(87) PCT Pub. No.: WO2008/153485
PCT Pub. Date: Dec. 18, 2008

(65) Prior Publication Data
US 2010/0181088 A1    Jul. 22, 2010

(30) Foreign Application Priority Data
Jun. 11, 2007    (SE) ...................................... 0701462

(51) Int. Cl.
*H01B 17/26* (2006.01)
*H02G 3/22* (2006.01)

(52) U.S. Cl. .... 174/15.3; 174/650; 174/142; 174/152 R; 16/2.1; 16/2.2

(58) Field of Classification Search .............. 174/11 BH, 174/15.3, 650, 659, 68.1, 142, 137 R, 152 R, 174/135, 152 G, 153 G, 262, 152 GM, 70 C, 174/68.3, 151; 16/2.1, 2.2; 439/79, 926; 361/302–305, 306.1
See application file for complete search history.

(56) References Cited

U.S. PATENT DOCUMENTS

| 3,781,453 | A | | 12/1973 | Funk et al. |
| 4,334,729 | A | | 6/1982 | Allen et al. |
| 4,454,381 | A | * | 6/1984 | Ito et al. .......................... 174/650 |
| 5,352,853 | A | * | 10/1994 | Takagi ........................ 174/152 R |
| 6,068,494 | A | * | 5/2000 | Tokuwa ........................... 439/79 |
| 6,433,276 | B1 | * | 8/2002 | Bellora ................. 174/152 GM |
| 7,071,416 | B2 | * | 7/2006 | Ricco et al. ............... 174/152 G |
| 7,745,725 | B2 | * | 6/2010 | Paterek et al. ......... 174/152 GM |

FOREIGN PATENT DOCUMENTS
EP    0 592 782 B1    9/1996

OTHER PUBLICATIONS

International Search Report mailed Sep. 30, 2008, in PCT/SE2008/050674, 3 pages.

* cited by examiner

*Primary Examiner* — Angel R Estrada
(74) *Attorney, Agent, or Firm* — Foley & Lardner LLP

(57) ABSTRACT

The present invention provides an electrical feed-through (200) for making a durable and reliable electrical connection through a wall (227) of a vacuum chamber (225). The electrical feed-through (200) comprises a tubular member having an open end (217) and a closed end (219). At least one conductor (201) extends through the closed end (217) and is fixed thereto by a vacuum sealing joint (214). The joint (214) is arranged so that it is not in line-of-sight from the open end (217). In this way impinging elements (220) and direct heat radiation (221) is prevented from directly reaching the joint (214), thereby extending the time it takes for contamination of the joint (214) to cause problems.

15 Claims, 7 Drawing Sheets

ELECTRICAL FEED-THROUGH

CROSS-REFERENCE TO RELATED APPLICATIONS

This application is a National Stage application of PCT/SE2008/050674, filed Jun. 5, 2008, which claims priority from Swedish patent application SE 0701462-4, filed Jun. 11, 2007.

TECHNICAL FIELD OF THE INVENTION

The present invention relates to electrical feed-throughs, which are used to make an electrical connection to devices inside vacuum chambers.

BACKGROUND OF THE INVENTION

Electrically connecting a device within a vacuum chamber to a power supply positioned outside the vacuum chamber typically requires an electrical feed-through—an airtight passage through a wall of the vacuum chamber in which passage one or more conductors are provided. A conductor of the feed-through is generally insulated from the wall of the chamber using an insulator, for example a ceramic material. Such electrical feed-throughs are commonly used to make an electrical connection from the exterior of the vacuum chamber to devices installed within the vacuum chambers. Typically electrical power has to be supplied to devices installed within the vacuum chambers such as thermal evaporation sources, substrate heaters etc, and/or electrical signals have to be retrieved from devices installed within the vacuum chambers such as temperature sensors, measurement devices, etc.

Many vacuum processes, e.g. physical vapour deposition, generate a substantial amount of heat, which raises the temperature inside the vacuum chamber to relatively high temperatures, i.e. above about 200° C. Over time elements originating from the vacuum process or residuals left in the vacuum chamber may degrade the insulating capacity of the electric feed-throughs by, for example, condensation of electrically conducting elements on the insulator of the feed-through resulting in an electrical short circuit between conductors extending through the feed-through or between the conductor and the vacuum flange. Moreover the exposure to reactive elements from the vacuum chamber may lead to chemical reactions or corrosion of the materials forming the joint between the conductor and the insulator, which eventually breaks the vacuum seal.

For example, $Cu(InGa)Se_2$-based thin film solar cells (CIGS) are fabricated by high vacuum co-evaporation of the elements Cu, In, Ga and Se at a substrate temperature of about 500° C. Since most of the vacuum chamber interior is heated to temperatures above 200° C., and not all Se immediately reacts to form $Cu(InGa)Se_2$, a partial pressure of Se in excess of $10^{-6}$ mbar is present in the chamber. Se will thus essentially come into contact with all the surfaces of the interior of the vacuum chamber. These surfaces will include the electrical power feed-throughs to the substrate heaters and the evaporation sources. In this situation Se may condense on the insulators of the feed-throughs, possibly also react chemically with other elements that have reached the same location, thereby forming an electrically conductive layer on the insulator of the feed-through resulting in short circuits and consequent malfunction of the substrate heaters and/or the evaporation sources. Se that reaches the electrical vacuum feed-through can also react chemically with the materials constituting the joint between the conductor and the insulator. This may result in corrosion and breakdown of the vacuum seal.

Short circuiting of the conductors of the electrical feed-through and breakdown of the vacuum seal is particularly a problem for production equipment, if one or more devices within the process chamber malfunctions due to the short circuit or the vacuum pressure begins to rise due to a leak. Such problems necessitate costly and time-consuming shut downs of the production equipment to replace the electrical feed-through. One example of this is an in-line production apparatus for $Cu(InGa)Se_2$-based thin film solar cells (CIGS) where one or more evaporation sources may cease to operation, which has a detrimental effect on the thin film properties, or where there is a leak at the electrical feed-through which makes it impossible to reach the desired vacuum pressure.

SUMMARY OF THE INVENTION

Obviously the prior art has drawbacks with regards to being able to provide an durable and reliable electrical feed-through for making an electrical connection through the wall of a vacuum chamber wherein processes are performed at elevated temperatures.

The object of the present invention is to overcome the drawbacks of the prior art. This is achieved by the electrical feed-through as defined in claim 1.

The present invention provides an electrical feed-through for making a durable and reliable electrical connection through a wall of a vacuum chamber. The electrical feed-through comprises a tubular member having an open end and a closed end and at least one conductor. The closed end comprises one through hole for each conductor. Each conductor extends through its own through hole and is fixed to the closed end by a vacuum sealing joint. The joint is arranged so that it is not in line-of-sight from the open end, i.e. there is no straight line path from the open end of the passage to the joint. In this way impinging elements and direct heat radiation are prevented from directly reaching the joint. Thus the impinging elements and the direct heat radiation can only reach the joint after being reflected off an intervening surface.

The tubular member is preferably bent and in one embodiment of the present invention the tubular member has an upper part with an open end intended to be adjacent to the vacuum chamber and a lower part which has the closed end—this end being closed by the vacuum sealing joint of the electrical feed-through. The upper part and the lower part are arranged at an angle to each other, the angle being chosen so that the joint is not visible (this naturally assumes that the materials of the tubular member and vacuum chamber are not transparent) from the open end of the tubular member and thus also not visible from the interior of the vacuum chamber.

In one embodiment of the present invention a cooling trap may be arranged on a section of the tubular member to make the trapping of impinging elements more efficient.

Each conductor is preferably in the form of an elongated cylinder and is rigid. Additionally a conductor may be divided into at least a first and a second conductor connected by an angled rigid connector, whereby a rigid and robust bent conductor can be accomplished.

An in-line production apparatus for manufacturing thin film solar cells (CIGS) comprising at least one passage in the wall of a vacuum process chamber may be provided with at least one electrical feed-through according to the present invention wherein the joint is not in line-of-sight from the interior of the vacuum chamber.

Thanks to the invention it is possible to provide an electrical feed-through with improved durability in harsh vacuum chamber environments. Thereby the reliability of electrical feed-throughs is improved and the time between scheduled and unscheduled maintenance is increased. The electrical feed-through can be provided at low cost and does not require any rebuilding of existing vacuum process chambers. Neither do electrical feed-throughs of the present invention impede the high vacuum capability or the pumping time to obtain a certain vacuum pressure.

Embodiments of the invention are defined in the dependent claims. Other objects, advantages and novel features of the invention will become apparent from the following detailed description of the invention when considered in conjunction with the accompanying drawings and claims.

BRIEF DESCRIPTION OF THE DRAWINGS

Preferred embodiments of the invention will now be described with reference to the accompanying drawings, wherein.

Figure 1:
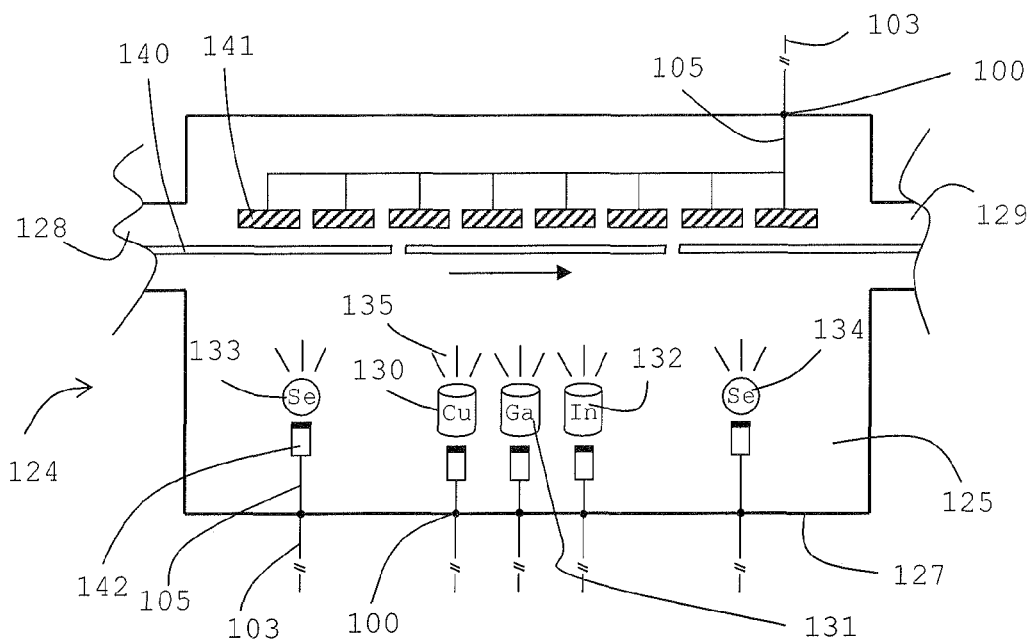
FIG. 1 is a schematic cross sectional view of a CIGS process chamber.

DETAILED DESCRIPTION OF EMBODIMENTS $Cu(InGa)Se_2$-based thin film solar cells (CIGS) are commonly fabricated by high vacuum co-evaporation of the elements Cu, In, Ga and Se. One example of a prior art in-line production apparatus 124 for such a process is shown in FIG. 1. The deposition system comprises a vacuum process chamber 125 with an inlet 128, an outlet 129, a plurality of substrate heaters 141, a copper evaporation source 130, a gallium evaporation source 131, and an indium evaporation source 132. Furthermore, selenium sources 133, 134 are located to give excess selenium at all growth positions in the deposition zone and distribute selenium vapour rather evenly throughout the deposition zone. Each evaporation source has an evaporation source heater 142 arranged thereto. Glass substrates 140 with a molybdenum (Mo) layer on the lower surface move through the CIGS process chamber from the inlet 128 to the outlet 129, whereby the lower surface of the substrates 140 are deposited with a flux 135 of material evaporated from the evaporation sources, finally forming the desired CIGS layer. Among other electrical devices inside the process chamber 125, the evaporation source heaters 142 and the plurality of substrate heaters 141 have to be supplied with power from the exterior of the vacuum process chamber 125. The power is supplied via external conductors 103 from a power source outside the vacuum process chamber 125 via electrical feed-throughs 100 in the wall 127 of the vacuum process chamber 125 and further via internal conductors 105 to the internal evaporation source heaters 142 and the substrate heaters 141 respectively.

Figure 2:
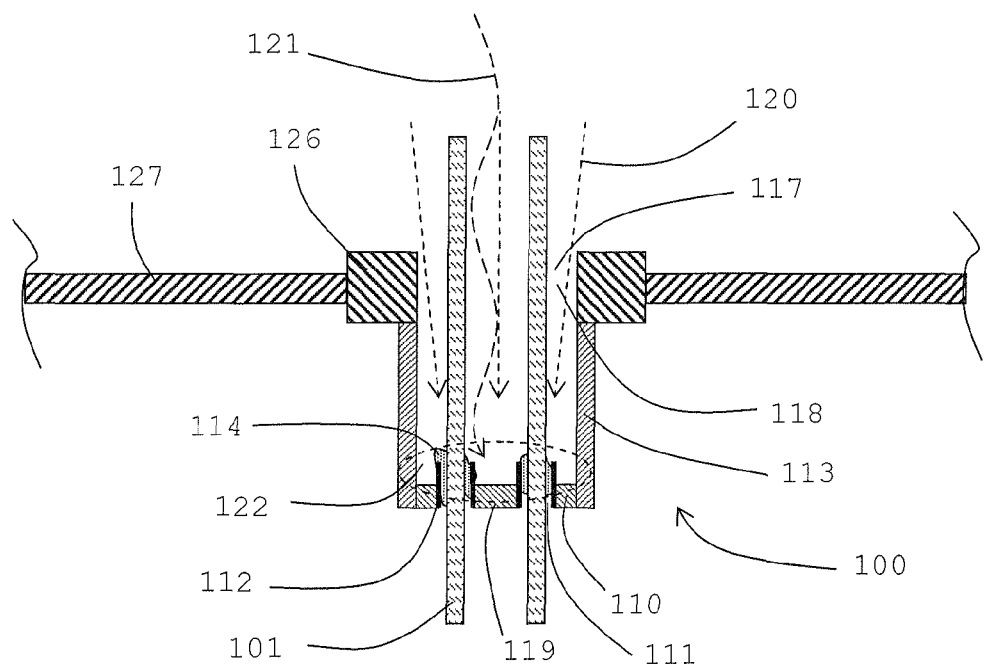
FIG. 2 is a schematic cross sectional view of a electrical feed-through according to prior art.

This is a particular example of a process where the durability and reliability of conventional electrical feed-throughs 100 such as the one shown in FIG. 2 is limited. FIG. 2 illustrates a prior art arrangement wherein a conventional electrical feed-through 100 is arranged within a passage 118 in the wall of the process chamber 125. A vacuum flange 126 provides an airtight seal between the wall 127 of the vacuum chamber 125 and the electrical feed-through 100. The conventional electrical feed-through 100 typically comprises a straight tubular member 113 extending from the vacuum flange 126 essentially perpendicular to the wall 127. The tubular member 113 has an open end 117 adjacent to the wall passage 118 and the opposite end 119 is closed end. Two electrical conductors 101 extend from the interior of the vacuum chamber 125 essentially in parallel with the tubular member 113 through through-holes 111 in the closed end 119, (where an insulator 110 electrically insulates the conductors 101 from each other and from the tubular member 113) to the exterior of the vacuum process chamber 125. To provide a vacuum tight joint 114 between the conductors 101 and the insulator 110 a metal tube 112 is typically bonded to the wall of each through hole 111 before mounting the conductors 101. After insertion of the conductors 101 the conductor 101 is soldered or brazed to the metal tube 112, which gives a vacuum tight joint 114.

The conductor 101 may be a separate conductor 101, which is connected to an internal conductor 105 at one end and to an external conductor 103 at the other end, or the conductor 101 may actually be an integral part of one or both of the internal and/or external conductors 105, 103.

During processing of the CIGS layer the temperature of the substrate 140 is about 500° C. and the heat generation from the individual evaporation source heaters 142 and the evaporation sources 130, 131, 132, 133, 134 is substantial, e.g. the copper source is held at about 1500° C. Hence the most of the interior of the vacuum chamber 125 is heated to temperatures above 200° C. In order to provide and maintain a sufficient access of Se in the process at all times, a partial pressure of Se in excess of $10^{-6}$ mbar is present in the chamber 125. As not all Se reacts immediately to form $Cu(InGa)Se_2$ Se will essentially come in contact with all the surfaces of the interior of the vacuum chamber 125. These surfaces will include the electric power feed-throughs 100 to the substrate heaters 141 and the evaporation source heaters 142. In this situation impinging Se 120 may condense on the insulators 110 of the feed-throughs 100, possibly also reacting chemically with other impinging elements 120, which can reach the same location, thereby forming an electrically conductive layer on the insulator 110 of the feed-through 100 which can result in short circuits and consequent malfunction of the substrate heaters 141 and/or the evaporation source heaters 142. Se reaching a critical region 122 of the electrical vacuum feed-through 100, which is indicated in FIG. 2 by the broken line, can also react chemically with the materials constituting the joint 114 between the conductor 101 and the insulator 110. This may result in corrosion and breakdown of the vacuum seal.

Figure 3:
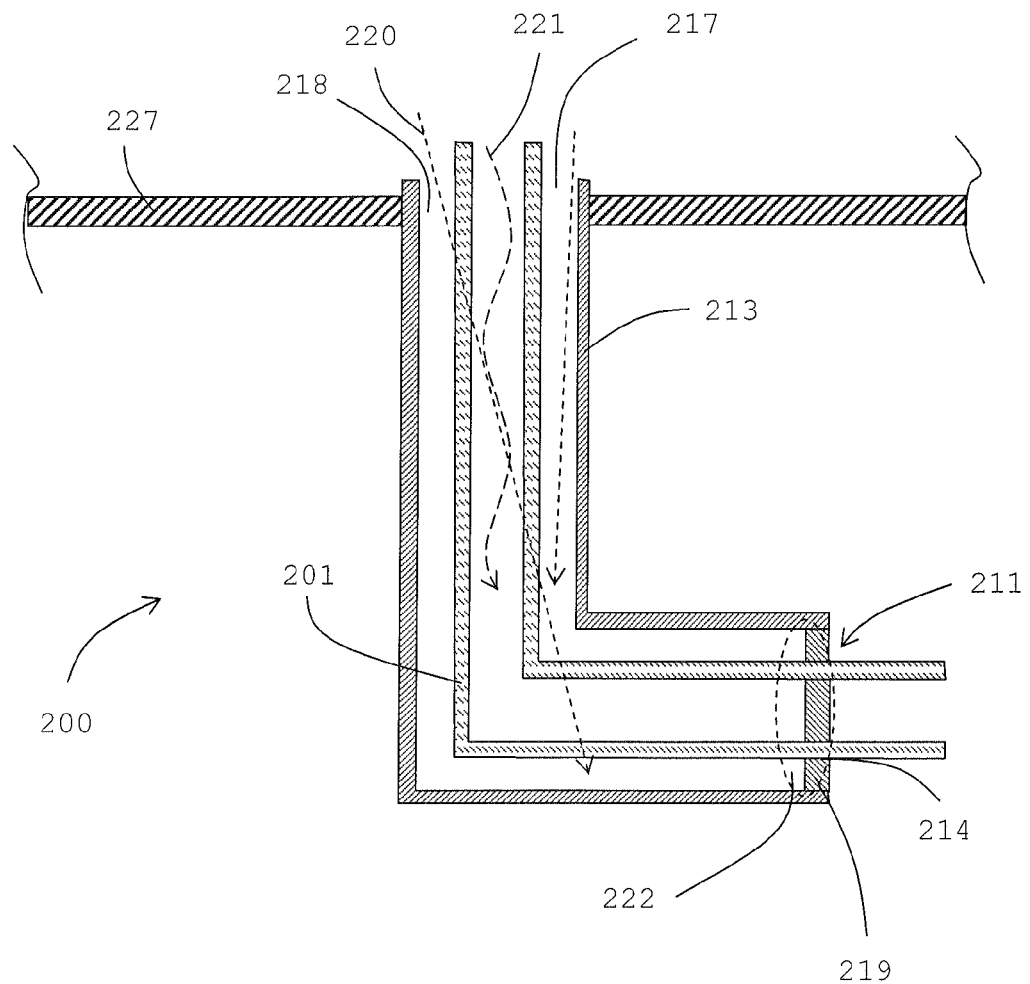
FIG. 3 is a schematic cross sectional view of an L-shaped electrical-feed-through according to a first embodiment of the present invention.

One embodiment of the present invention is schematically illustrated in FIG. 3. An electrical connection through a passage 218 in a wall 227 of a vacuum chamber 225 is provided by an electrical feed-through 200. The electrical feed-through comprises a tubular member 213 having an open end 217 and a closed end 219 and at least one conductor 201. The open end is adapted to be arranged in the passage 218 through the wall of the vacuum chamber 225 and the closed end comprises a through hole 211 for each conductor 201, each conductor 201 extending through its respective through hole 211. A joint 214 seals the closed end. A trap prevents impinging elements 220 from reaching a critical region 222 at the joint 214, where the risk for electrical short circuits and/or corrosion and subsequent breakdown of the vacuum seal otherwise would be significant. The trap is designed so that an element 220 or heat radiation 221 from the interior of the vacuum chamber 225 can not follow a straight path from the open end 217 to the joint 214, e.g. by having an L-shaped tubular member 213. In other words, the joint 214 is not in line-of-sight from the open end 217. In order to reach the joint 214 elements 220 would have to be reflected off the inner surface of the wall of the tubular member—however when elements come into contact with the inner surface they tend to stay there or are reflected with a lower energy which means that the number of molecules of elements which can reach the joint is significantly reduced, thereby extending the time it takes for contamination of the joint to cause problems. The electrical feed-through is in FIG. 3 exemplified with 2 conductors 201 and 202, which represent a common implementation. However, the electrical feed-through may comprises fewer or more conductors as required to accommodate different applications.

Figure 4:
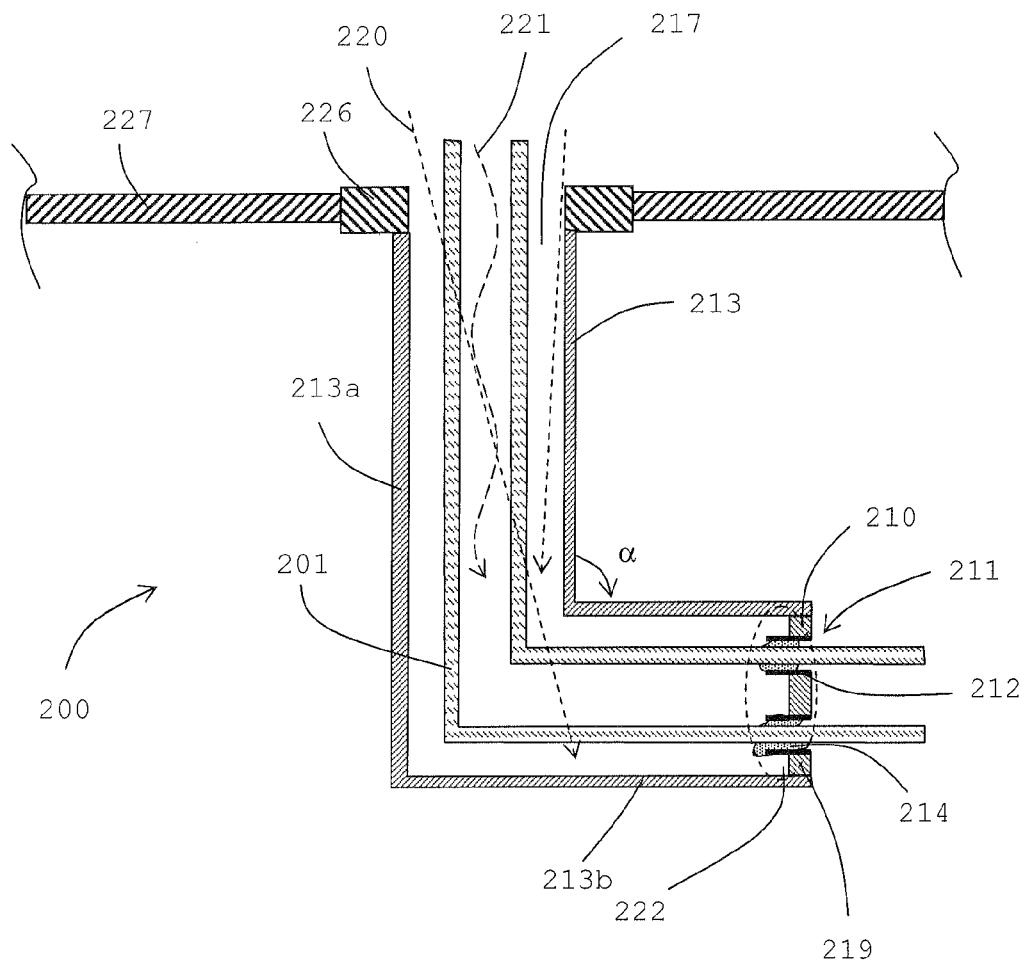
FIG. 4 is a schematic cross sectional view of an electrical-feed-through according to a second embodiment of the present invention.

As shown in FIG. 4, one embodiment of the present invention is an electrical feed-through 200 comprising a tubular member 213 having an open end 217 and a closed end 219, wherein the open end 217 is adapted to be arranged within a passage 218 in the wall 227 of the vacuum chamber 225 and the tubular member 213 is closed by an insulator plate 210. Two conductors 201, separated from each other, extend from the interior of the vacuum chamber 225 essentially in parallel with the tubular member 213 through separate through holes 211 in the insulator 210 in the closed end 219 to the exterior of the vacuum chamber 225. Each through hole 211 has a metal tube 212 bonded therein and a joint 214 fixes the conductors in the insulator through holes 211 and provides a vacuum sealing. The insulator 210 electrically insulates the conductors 201 from each other and from the tubular member 213. The trap is for example accomplished by dividing the curved tubular member 213 into a first and a second tubular member part 213a, 213b arranged at an angle α, in this particular embodiment 90°, to each other so that impinging elements 220 are prevented from reaching the critical region 222, i.e. the insulator 210 and the joint 214. In other words, the critical region 222 is not in line-of-sight from the hot parts of the vacuum chamber 225. Hence impinging elements 220 are trapped between the vacuum chamber 225 and the bend or the region around the bend. In addition, the insulator 210 is not exposed to the direct heat radiation 221 from the interior of the process chamber. As with the conventional electrical feed-through 100 disclosed above, the electrical feed-through 200 according to the present invention is adapted to be arranged within a passage 218 in the wall 227 of a process chamber 225. A vacuum flange 226 provides a seal between the wall 227 of the vacuum chamber 225 and the tubular member 213 of the electrical feed-through 200.

Trapping of impinging elements 220, such as Se, in the processing of thin film solar cells (CIGS), so that they are prevented from reaching the critical region 222 where the conductors 201 extend through the closed end 219 prevent deposition of elements that can result in short circuits of the kind described above. Furthermore chemical reaction or corrosion of the materials forming the joint 214, which eventually breaks the vacuum seal due to reactive elements from the vacuum chamber 225, is prevented. In addition to not being in line-of-sight for impinging elements 220 the critical region 222 is protected from direct heat radiation 221 from the process chamber 225. This is advantageous since chemical reactions causing corrosion often are accelerated at higher temperatures. Moreover, temperature variations in the critical region cause dimensional changes of the different parts of the electrical feed-through, which in turn may induce stresses in the critical region. These thermally induced stresses may also contribute to deterioration of the joint 214. With thermal shielding according to the invention this is avoided. In order to obtain a trap that prevents impinging elements 220 and direct heat radiation 221, the angle α of the bend in the embodiment described above can in principle be varied between 0° and 180° depending on the length of the first and second tubular members 213a, 213b. Preferably the angle α is from 90° to 135° with a typical length of the first and the second tubular member parts that are 1 to 3 times the tubular diameter. Commonly the diameter for vacuum flanges is 16, 40 or 63 mm. However, it is possible to use other diameters in devices according to the present invention.

Figure 5:
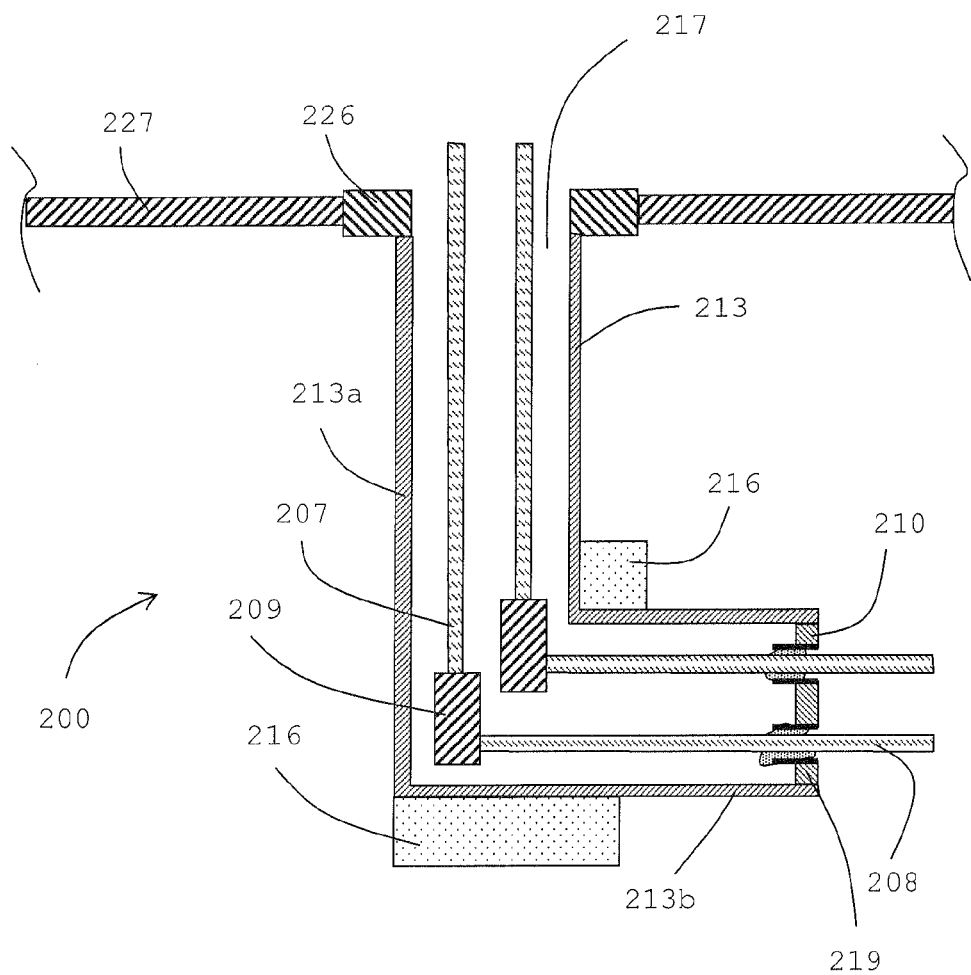
FIG. 5 is a schematic cross sectional view of an electrical-feed-through with rod-shaped connectors and a cold trap according to a further embodiment of the present invention, FIG. 6 are schematic cross sectional views of further embodiments of electrical feed-throughs according to the present invention with (a) a double walled tubular member, (b) a tubular member with protrusions, (c) a tubular member having a plurality of bends, and (d) a smoothly bent tubular member.

In one embodiment of the present invention, as schematically illustrated in FIG. 5, the tubular member 213 is equipped with at least one cold trap 216 (i.e. a means for cooling a portion of the tubular member) arranged at or close to the bend of the tubular member 213. This cold trap 216 makes the trapping of the impinging elements 220 more efficient. The cooling of the tubular member 213 also prevents heating of the critical region 222, which for the electrical feed-through 200 according to the present invention mainly is caused by heat conduction from the process chamber 225 via the vacuum flange 226 to the wall of the tubular member 213. As shown in FIG. 5, the conductors 201 are in the form of a first and a second rod-shaped conductor 207, 208, respectively. The rod-shaped conductors 207, 208 are essentially straight.

Figure 6A:
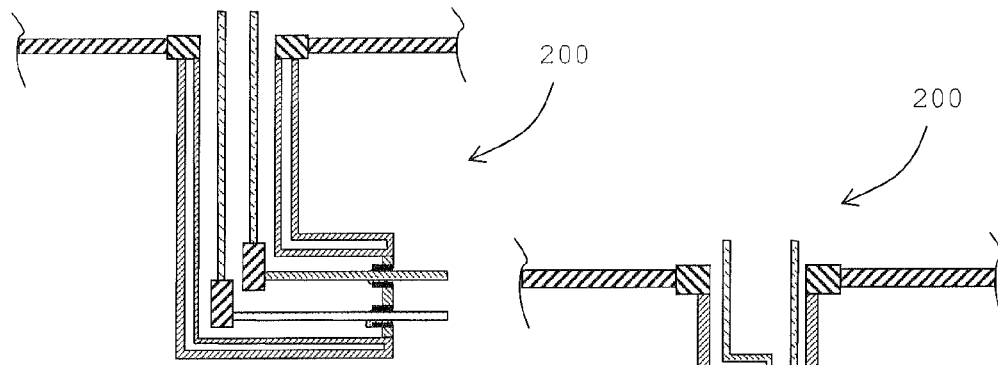

In one embodiment (not shown) of the present invention the tubular member 213 is provided with a cold trap 216 by having the tubular member at least partly double walled with a cooling medium, such as water or liquid nitrogen, inside. A schematic cross-section of the double walled electrical feed-through 200 is shown in FIG. 6a. Other alternatives for the placement and design of the cold trap 216 are possible, e.g. the cold trap can extend transversally through the tubular member 213, i.e. the cold trap may be internal.

The conductor 201 is preferably a stiff rod, which has at least one bend to make it follow the shape of the tubular member 213. By having such stiff conductors 201 the risk that a conductor comes into contact with an adjacent conductor 201 and/or the tubular member 213 is minimized. Flexible conductors preferably have to be stretched or fixed by complicated means to avoid short-circuits. The bend may be accomplished by bending the conductor or the bend may be accomplished using one connector 209 between two straight conductors 207, 208, as illustrated in FIG. 5. One alternative is to have two straight Mo-rods (conductors) 207, 208 joined by a Mo-connector 209. The Mo-connector 209 is preferably a block made of Mo, wherein there are two threaded holes pointing in the direction of the open end 217 and the closed end 219 respectively. The Mo-rods 207, 208 each comprise a threaded end which can be screwed into the connector 209. Another alternative is to have straight Mo-conductors 207, 208, which are retained in holes in a Mo-connector 209 by screws or other fastening means. These alternatives, which are given by way of example only, give a robust and rigid conductor 201. Other alternatives may comprise other conductive materials such as stainless steel, as understood by a person familiar with vacuum technology.

Although the present invention is described in connection to this example of vacuum process where there may be a problem with the durability of the electrical feed-throughs, it should be understood that the present invention is not limited to this example only, but is applicable to any other vacuum process chamber, particularly when working at elevated process temperatures, and/or using electrically conductive elements and/or reactive elements.

The electrical feed-throughs 200 described herein are suitable for vacuum process chambers 225 wherein the processing temperatures are high and where elements originating from the vacuum process or residuals left in the vacuum chamber may degrade conventional electric feed-throughs.

Figure 6B:
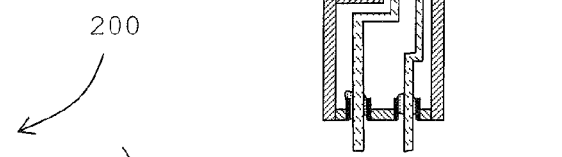
Figure 6C:
Figure 6D:
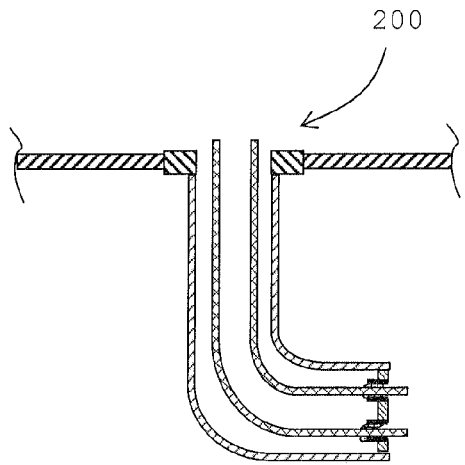

The electrical feed-through 200 can be designed in many other ways than the L-shape disclosed in FIGS. 3-5 to obtain a path through the tubular member so that the joint 214 is not in line-of-sight from the open end 217 of the tubular member 213. In FIG. 6b a schematic cross section of a straight tubular member 213 with protrusions 223, integral with the tubular member 213, forming a curved path through the tubular member 213 is shown. In FIG. 6c an electrical feed-through 200 according to the present invention is shown. The tubular member 213 therein has a plurality of bends. Moreover, the tubular member 213 does not have to be bent with a sharp corner as shown in the described embodiments. In FIG. 6d a 90° bend with a rounded corner is shown. The evacuation of a design where the tubular member 213 does not have any narrow portions or obstacles along its length is advantageous. Furthermore the diameter and the length of the tubular member 213 are important for the evacuation properties. Commonly used tubular diameters are mentioned above. For an L-shaped design like in FIGS. 3-5 the lengths of the vertical section and the horizontal section are preferably about 1-3 diameters. The construction of the conductors is also simplified with the kind of design shown in FIGS. 3 and 4. A plurality of bends implies that also the conductor 201 has to be bent an equal number of times as the tubular member 213.

Figure 7:
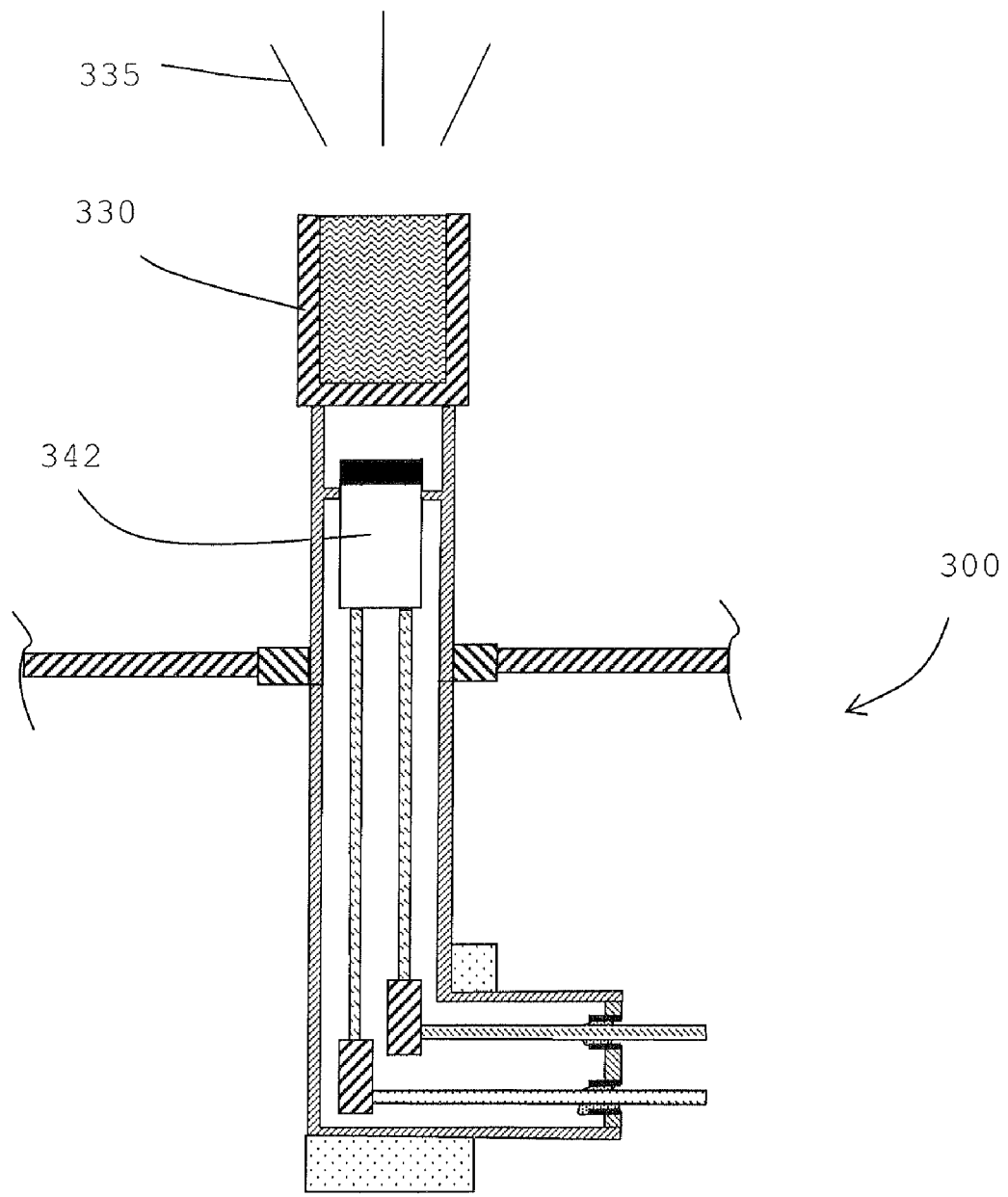
FIG. 7 is a schematic cross-sectional view of an embodiment of an evaporation source package according to the present invention.

In one embodiment of the present invention an electrical feed-through 200 is integrated with an evaporation source on the part of the electrical feed-through 200 that is intended to be installed inside the vacuum chamber 225. This forms an evaporation source package, which can be installed in a vacuum chamber 225 as a single unit. One example of such an arrangement is shown in FIG. 7. The evaporation source is in this case a copper source. However, any other evaporation source or other device can be arranged in a similar way.

Figure 8:
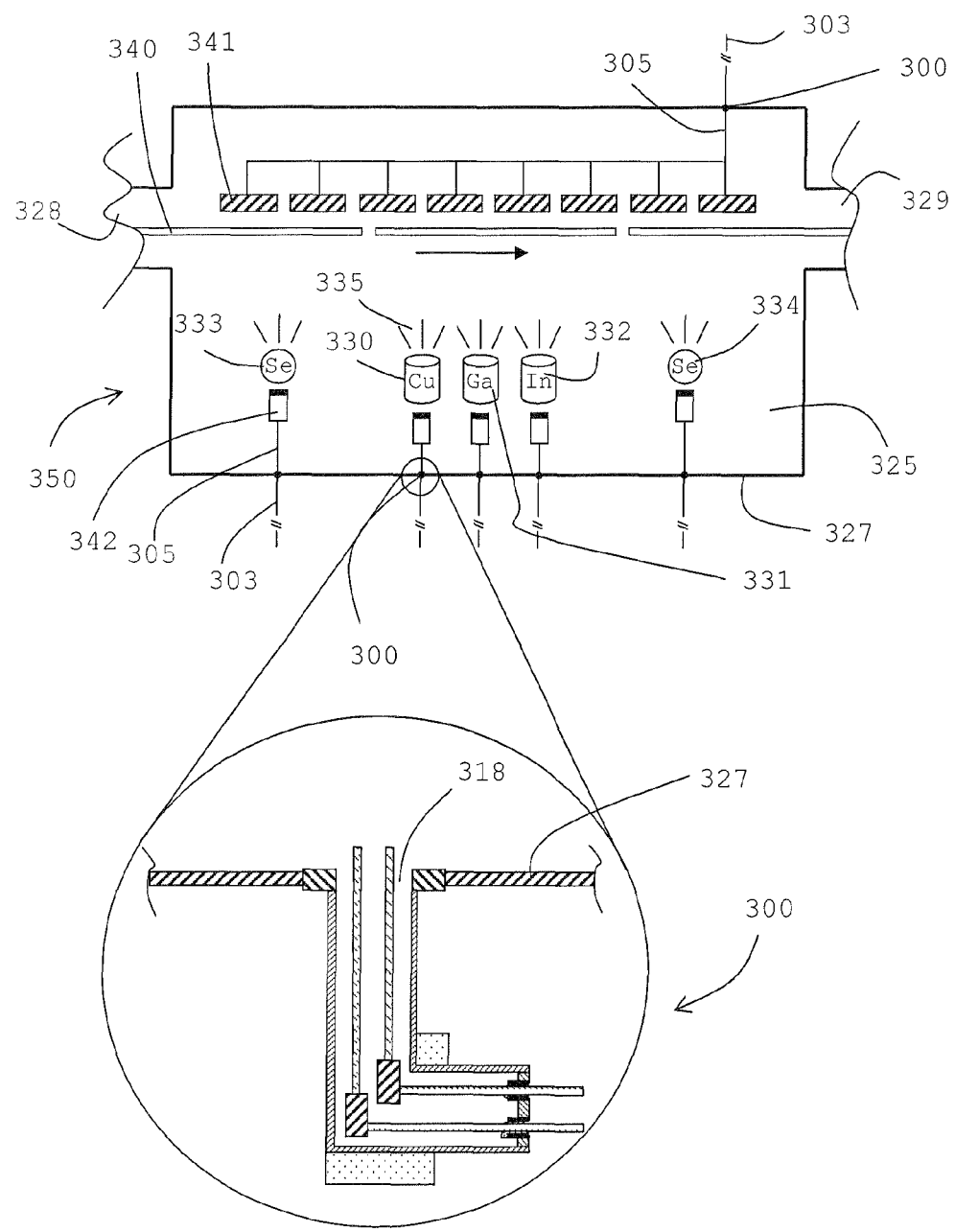
FIG. 8 is an in-line production apparatus for manufacturing of thin film solar cells comprising at least one electrical feed-through according to the present invention.

In one embodiment of the present invention electrical feed-throughs 300 according to the present invention are used in an in-line production apparatus 350. The deposition system, see FIG. 8, comprises a vacuum process chamber 325 with an inlet 328, an outlet 329, a plurality of substrate heaters 341, at least one copper evaporation source 330, at least one gallium evaporation source 331, and at least one indium evaporation source 332. Furthermore, at least one selenium source 333 are located to give excess selenium at all growth positions in the deposition zone and distribute selenium vapour rather evenly throughout the deposition zone. Each evaporation source 332 has an evaporation source heater 342 arranged thereto. Glass substrates 340 with a molybdenum layer move through the CIGS process chamber from the inlet 328 to the outlet 329, whereby the lower surface of the substrates 340 are coated with a flux of material evaporated from the evaporation sources, finally forming the desired CIGS layer. Among other electrical devices inside the process chamber 325, the evaporation source heaters 342 and substrate heaters 341 have to be supplied with power from the exterior of the vacuum process chamber 325. The power is supplied via external conductors 303 from the power source outside the vacuum process chamber 125 via electrical feed-throughs 300 in the wall 327 of the vacuum process chamber 325 and further via internal conductors 305 to the internal evaporation source heaters 342 and the substrate heaters 341. The electrical feed-throughs 300 according to the invention may be used for supplying power to at least one of the Cu, In, Ga and Se evaporation sources heaters 342, and/or the substrate heaters 341. In FIG. 8 the electrical feed-through 300 used to power the Cu source heater 330 is shown in a magnified cross-sectional view. The design of this feed-through is according to the design shown in FIG. 5. However, any electrical feed-through 300 according to the present invention can be used.

While the invention has been described in connection with what is presently considered to be the most practical and preferred embodiments, it is to be understood that the invention is not to be limited to the disclosed embodiments, on the contrary, is intended to cover various modifications and equivalent arrangements within the appended claims.

The invention claimed is:

1. An electrical feed-through for making an electrical connection through a passage in a wall of a vacuum chamber comprising:
   a tubular member having an open end and a closed end;
   at least one conductor;
   one through hole in the closed end for each conductor, which conductor extends through the through hole; and
   a joint sealing the through hole that comprises the conductor;
   wherein the joint is not in line-of-sight from the open end,
   wherein the electrical feed-through comprises at least one cold trap.

2. An electrical feed through according to claim 1, wherein the tubular member has an upper part comprising the open end and a lower part comprising the closed end, and the upper part and the lower part are arranged at an angle α to each other.

3. An electrical feed-through according to claim 2, wherein the angle α is from 90° up to 135°.

4. An electrical feed-through according to claim 2, wherein the upper part and lower part have the same diameter and length of the upper part and the lower part is 1-3 times this diameter.

5. An electrical feed-through according to claim 1, wherein the cold trap is arranged on the outside of the tubular member.

6. An electrical feed-through according to claim 1, wherein the cold trap is arranged at least party in the interior of the tubular member.

7. An electrical feed-through according to claim 1, wherein the tubular member is double walled and is adapted to be filled with a cooling medium.

8. An electrical feed-through according to claim 1, wherein the conductor is made of molybdenum.

9. An electrical feed-through according to claim 1, wherein a device is integrated on the open end of the tubular member, forming a device package to be installed in a passage in the wall of the vacuum chamber.

10. An electrical feed-through according to claim 9, wherein the device comprises an evaporation source or a substrate heater.

11. An in-line production apparatus for manufacturing of thin film solar cells (CIGS) comprising at least one passage in the wall of a vacuum process chamber, wherein at least one electrical feed-through according to claim 1 is arranged in the passage.

12. An electrical feed-through for making an electrical connection through a passage in a wall of a vacuum chamber comprising:
 a tubular member having an open end and a closed end;
 at least one conductor;
 one through hole in the closed end for each conductor, which conductor extends through the through hole; and
 a joint sealing the through hole that comprises the conductor;
 wherein the joint is not in line-of-sight from the open end,
 wherein the conductor comprises a first and a second rod-shaped conductor connected to each other.

13. An electrical feed-through according to claim 12, wherein the first and the second conductor are connected by a connector.

14. An electrical feed-through according to claim 13, wherein the first and the second conductor and the connector comprise threads, which are used to join the conductors to threaded holes in the connector.

15. An electrical feed-through according to claim 13, wherein the connector is made of molybdenum.

* * * * *